United States Patent [19]

Curtiss et al.

[11] 4,356,440
[45] Oct. 26, 1982

[54] POWER FACTOR CORRECTION SYSTEM

[75] Inventors: William P. Curtiss, Winthrop; William C. Colley, III, Boston, both of Mass.

[73] Assignee: The Charles Stark Draper Laboratory, Inc., Cambridge, Mass.

[21] Appl. No.: 188,305

[22] Filed: Sep. 18, 1980

[51] Int. Cl.³ .............................................. G05F 1/70
[52] U.S. Cl. .................................... 323/210; 322/20; 322/47; 323/211
[58] Field of Search ............................. 323/209-211; 322/20, 47

[56] References Cited

U.S. PATENT DOCUMENTS

| 1,738,344 | 12/1929 | Anderson . |
| 1,931,644 | 10/1933 | Chestnut . |
| 1,940,295 | 12/1933 | Chutter . |
| 2,078,667 | 4/1937 | Kado . |
| 2,243,584 | 5/1941 | Toda . |
| 2,293,484 | 8/1942 | Anderson . |
| 2,298,026 | 10/1942 | Bany . |
| 2,436,302 | 2/1948 | Hyde et al. . |
| 2,451,939 | 10/1948 | Geiselman et al. . |
| 2,460,467 | 2/1949 | Nelson et al. . |
| 2,484,575 | 10/1949 | Livingston . |
| 2,705,301 | 3/1955 | Marbury . |
| 2,871,439 | 1/1959 | Shaw . |
| 2,881,376 | 4/1959 | Shaw . |
| 3,002,146 | 9/1961 | Lorrig et al. . |
| 3,002,147 | 9/1961 | Wasserman . |
| 3,043,115 | 7/1962 | Harter . |
| 3,084,323 | 4/1963 | Sommer et al. . |
| 3,185,811 | 5/1965 | Kasper et al. . |
| 3,391,329 | 7/1968 | Meyer . |
| 3,419,792 | 12/1968 | Kasper et al. . |
| 3,530,370 | 9/1970 | Yamachi et al. . |
| 3,675,117 | 7/1972 | Reimers . |
| 3,731,183 | 5/1973 | Johnson et al. . |
| 3,821,456 | 6/1974 | Havas . |
| 3,829,758 | 8/1974 | Studtmann . |
| 3,832,625 | 8/1974 | Gyugyi . |
| 3,855,519 | 12/1974 | Waldmann . |
| 4,037,044 | 7/1977 | Havas . |
| 4,052,648 | 10/1977 | Nola . |
| 4,139,723 | 2/1979 | Havas . |
| 4,162,442 | 7/1979 | Frank . |

OTHER PUBLICATIONS

Brennen, M. B. and Abbondanti, A., "Static Exciters for Induction Generators", IEEE Transactions on Industry Applications, vol. IA-13, No. 5, Sep./Oct. 1977, (pp. 422-428).
Frank, H. and Landstrom, B., "Power Factor Correction with Thyristor-Controlled Capacitors", ASEA Journal, vol. 44, #6, 1971, (pp. 3-7).
Al-Badwaihy, K., El-Bidweihy, E., & Effat, A., "Automatic Power Factor Correction of Inductive Loads", IEEE, 1979, (pp. 495-502).

Primary Examiner—William H. Beha, Jr.
Attorney, Agent, or Firm—Kenway & Jenney

[57] ABSTRACT

A discrete-time, closed loop power factor corrector system controls the coupling of a delta-connected switched capacitor array to a 3- or 4-wire power line which may have time-varying, unbalanced, inductive loads. For inductive loads that cannot be exactly compensated with a delta-connected capacitance, the corrector system minimizes the total RMS reactive current drawn from the power line.

9 Claims, 18 Drawing Figures

POWER FACTOR CORRECTION SYSTEM

REFERENCE TO RELATED APPLICATION

The subject matter of this application is related to that of U.S. patent application Ser. No. 188,306, of William P. Curtiss and Donald E. Fulton, entitled "Induction Generator System with Switched Capacitor Control", filed on even date herewith.

BACKGROUND OF THE INVENTION

This invention is in the field of electric power distribution, and more particularly, relates to power factor correction for power distribution systems.

Low power factor loads have been a problem to electric power users, distributors, and producers since the induction machine came into wide use. More recently, loads such as induction heaters have contributed to the problem. The extra current drawn by the reactive part of the load causes voltage drops and losses in the resistance of power generation and distribution equipment. The voltage drops cause poor voltage resulation at the low power factor user and neighboring users. High reactive power demand also causes penalties to be added to the electric bills of low power factor users because it reduces the amount of real power that can be generated by or transmitted through equipment of a given kVA rating.

It is known in the prior art that the reactive component of load power can be generated locally by connecting reactance (or effective reactance realized with thyristor inverters) of the opposite sign in parallel with the offending load. This relieves the power supply of the reactive current burden, thus improving efficiency and voltage resulation. If the load reactance is fixed, the compensating reactance can also be fixed. If, however, the load reactance is varying, the compensating reactance must be variable and controlled so that it follows the variations in load reactance.

Reactive power control schemes fall generally into three categories: (1) direct computational or feed-forward control, (2) feedback control, and (3) hybrid control.

Direct computational control involves measuring the reactive power drawn by the load (via the current and voltage sensors) and commanding a corresponding amount of reactive power from the compensating reactance. This method is an open-loop control scheme and has the high speed of response that goes with open-loop control. However, the response time is limited by the reactive power sensing circuitry and by the response time of the compensating reactance to commands. High speed is desirable because it reduces the light flicker caused by reactive inrushes from, for example, an induction machine on start-up. Open-loop control requires that the sensing circuits and compensating reactance have well-known scale factors. A scale factor of, for example, +10% in the sensing circuitry means that 10% too much compensating reactance will be applied and the reactive power drawn from the line will not be zero.

Feedback control involves measuring the reactive power drawn from the grid and forcing it to zero by increasing or decreasing the compensating reactance. Feedback control can be slow if stability considerations force reductions in loop bandwidth. Since feedback control is a nulling operation, well-defined scale factors are unnecessary. Even offsets only do damage in the sensing circuitry. Low precision circuitry costs less and is easier to produce than high precision circuitry.

Hybrid control is a combination of feed-forward and feedback control. An approximate solution is computed quickly through the feed-forward path. Errors in the solution are then corrected by the feedback control loop. This approach has good flickersuppression properties because even an approximate solution can make flicker unnoticeable. Precise scale factors are not required since the feedback loop can correct any errors. The disadvantage of this scheme is its complexity. Two sets of reactive power sensors are required as both the load and power supply reactive power must be monitored. Having two loops also complicates the control implementation.

Accordingly, it is an object of this invention to provide an improved power factor correction system with a controlled reactance network.

SUMMARY OF THE INVENTION

Briefly, a power factor correction (PFC) system in accordance with the present invention is coupled to at least n power lines of an n phase power distribution system. The PFC system includes an N-stage switched capacitor array, where N is an integer. Each stage includes n capacitor networks where each capacitor network is associated with a pair of the power lines. The capacitor networks of each stage are each characterized by a predetermined capacitance for that stage. Each of the capacitor networks includes an associated capacitor switch which is responsive to an applied trigger signal for selectively coupling that capacitor network across its associated power lines.

A feedback network is also coupled to the power lines and includes a power factor detector which controls the generation of the trigger signals so that the power factor at the power lines is substantially optimally close to one, even though local loads may be unbalanced.

For an n-phase closed loop power factor correction system, during the first cycle and for all subsequent cycles, the power factor correction system measures the residual n reactive power terms (each quadrature line current times its corresponding line-to-neutral voltage) during one cycle. The resultant residual or error signals are representative of the change in reactive power since that last correction. The PFC system then uses this error signal to determine the capacitance to be added to or subtracted from the respective phases of the capacitor array during the next correction cycle. Between power factor correction cycles, the actual power factor is detected and used in determining the n independent line-to-line capacitance changes required to correct the power factor. These incremental values are summed with the previous values to compute the new desired values. At a correction time, trigger signals, representative of the new values which are to be switched from the capacitor array are applied by way of an interface to the various stages of the array.

Thus, the PFC system measures the residual line-to-neutral reactive power. This value may be positive or negative. In systems where the capacitor array is a wye configuration, the complement of this reactive power is the value required to compensate (i.e. the corresponding value capacitive increment, positive or negative, may be switched into the system from line-to-neutral).

In one form of the invention, which utilizes a three phase delta configuration capacitor array, the required incremental line-to-neutral reactive power correction value for the output line terminal of each line, and then converts that value to an equivalent reactive power delta correction. The incremental delta capacitor equivalent associated with a determined incremental wye value is formed from two equal incremental delta capacitors having one terminal coupled to the associated wye terminal, with each of those incremental delta capacitors having the same sign and one-third the capacitance of the incremental value of the wye computed value. The third opposing leg incremental delta capacitor has an opposite sign and has the same one-third capacitance magnitude.

These above values for the various output terminals are incremental values. The net required delta capacitors are determined by adding to the most recent corrective state, the required change, which in the algebraic sum of the three incremental capacitance values for each terminal. Thus, the three new capacitors for the delta network are obtained by adding appropriately transformed wye incremental values to the previous delta value.

The trigger signals control the switching of the desired total capacitor value across the various lines at the next cycle during which power factor correction is made.

In cases where a computed delta capacitive value for power factor correction is determined to have a net negative value, the correction values are modified in the following optimum manner before generating the trigger signals. First, one-third of the magnitude of this negative value is subtracted from each of the other non-negative line-to-line capacitors to specify two new total values to be placed on line. The terminal pair associated with the original desired negative capacitor compensation is left uncompensated.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

The related application referenced above, U.S. patent application Ser. No. 188,306, discloses a power generating system (shown in this application in FIGS. 1–12) which includes a power factor correction system. That system may function as a power source which can run in parallel with a power grid. If the grid voltage fails, the system can disconnect itself from the grid and provide power autonomously.

Figure 1:
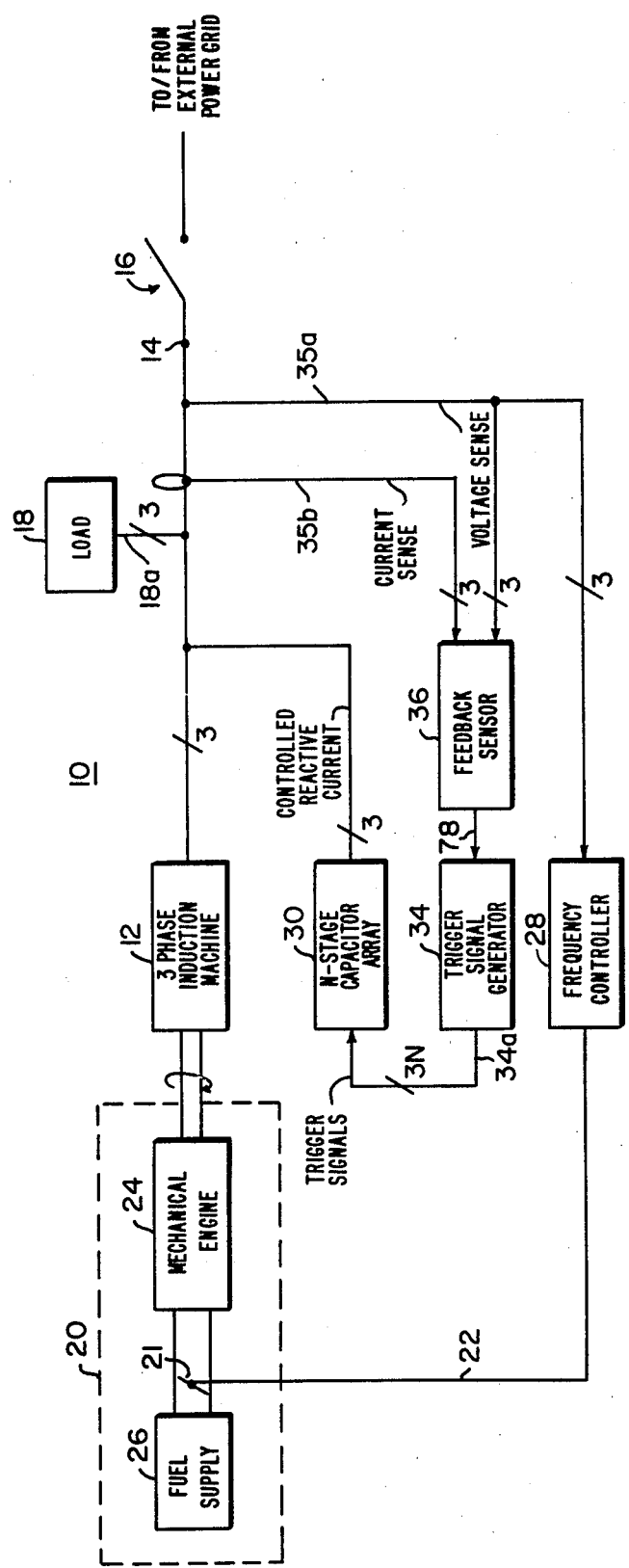
FIG. 1 shows in block diagram form, an induction generator system.

FIG. 1 shows an induction generator system 10 which includes a three phase induction machine 12 having three output lines coupled to an associated set of three output terminals (indicated collectively by reference designation 14). In alternate embodiments, a fourth (or neutral) line may be provided in addition to the three output lines 14. In the present embodiment, the output terminals 14 may be selectively controlled by a switch 16 so that the terminals 14 may be coupled to an external power grid for supplying and receiving real and reactive power from such a grid, or alternatively may be de-coupled from that grid for autonomous operation. A local load is indicated by block 18 coupled to the output lines of the induction machine 12. In other forms of the invention, different phase induction machines (e.g. single phase) may be similarly configured.

A controlled-torque prime mover, or driver, 20 is adapted to drive the input shaft of induction machine 12 at a frequency related to a frequency control signal applied by way of a line 22. In the present embodiment, the prime mover 20 is an internal combustion engine 24. The speed of the engine 24 is controlled by a throttle 21 driven by the signal on line 22. Throttle 21 controls the fuel flow from a fuel supply 26. In alternative embodiments, the prime mover may be a windmill, for example, with its output torque (speed) controlled by varying the pitch of the blades. In yet other forms, the prime mover may be a d.c. motor with its output speed controlled by a conventional motor speed control signal.

The frequency control signal on line 22 is provided by a frequency controller 28 which is coupled back to the output lines from machine 12.

A switched capacitor array 30 is adapted to provide a controlled reactive current to the various output lines of the induction machine 12. Array 30 includes N stages, each including a capacitor network associated with the various permutations of the pairs of the output lines of machine 12. In the present embodiment where machine 12 is three phase, each stage of array 30 includes three identical capacitor networks. Each capacitor network includes one or more capacitors providing a characteristic capacitance value for that stage and has an associated switch network. The capacitance values within each stage are characterized by substantially the same net capacitance. The switch network is responsive to an applied trigger signal for selectively coupling the capacitor networks of that stage across the associated pair of output lines of machine 12.

Thus, in the preferred embodiment, the switched capacitor array 30 includes N stages, where each stage is in the "delta" configuration mode (i.e. each stage includes a capacitor selectively coupled between an associated pair of output lines of machine 12). In an alternate, but equivalent configuration, the array 30 may include N stages, where each stage is in the "wye" configuration (i.e. each stage includes a capacitor selectively coupled between an associated output line of machine 12 and a common potential on a neutral line. The illustrated delta configuration generally permits the use of capacitors with higher voltage ratings, and less capacitance (and correspondingly less expense), than its dual wye configuration.

In the present three-phase embodiment, there are 3N trigger signals (on 3N trigger signal lines 34a) applied to the N-stage array 30 for selectively switching the various capacitors in and out of operation. The trigger signals are provided by trigger signal generator 34, which in turn is driven by a feedback sensor 36. In the presently described embodiment, the feedback sensor 36 is coupled to the output lines from induction machine 12 by way of three voltage sense lines 35a providing signals representative of the voltage on those output lines, and by way of three current sense lines 35b providing signals representative of the current through those output lines. Thus, the system 10 is "closed loop". In alternate forms, the system 10 may be "open loop" and current sense lines 35b may sense current in lines 18a passing to the local load 18. In the configuration of FIG. 1, when the switch 16 couples terminal 14 to an external power grid, the sensor 36 functions in a first state to determine the reactive current at terminals 14. When switch 16 decouples system 10 from the external grid, i.e. for autonomous operation, sensor 36 functions in a second state to determine the amplitude of the voltage on the output lines from machine 12.

Figure 2:
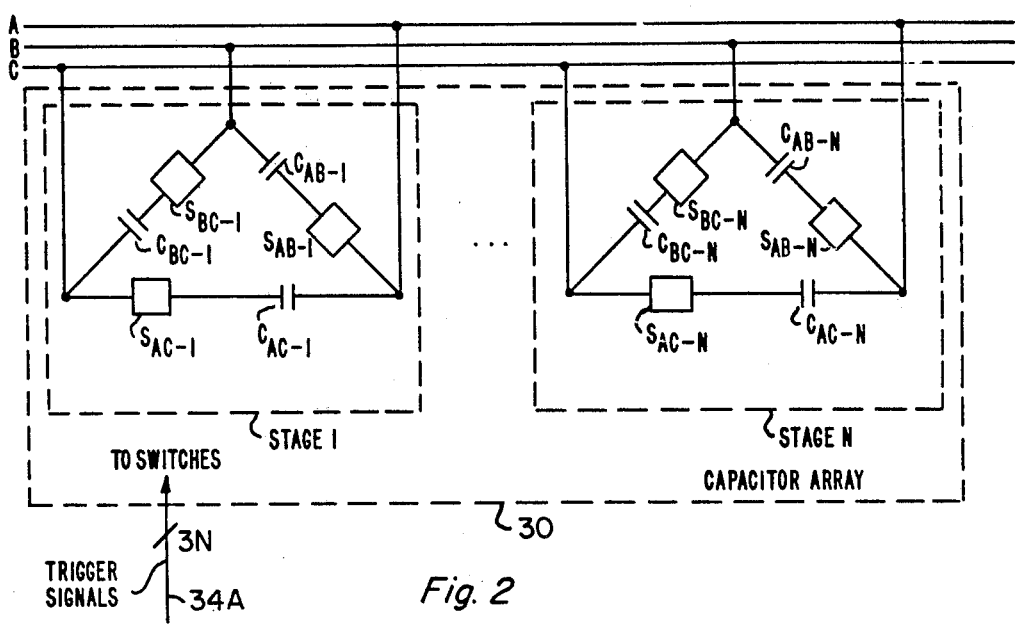
FIG. 2 shows in schematic form, an embodiment of the switched capacitor array of the system of FIG. 1.

FIG. 2 shows the first and $N^{th}$ stages of the capacitor array 30, and the manner in which those stages are coupled to the output lines from induction machine 12. In FIG. 2, the three output lines from machine 12 are denoted A, B and C. The first and $N^{th}$ stages of array 30 are shown schematically to include a capacitor (denoted C with subscripts) and a switch (denoted S with subscripts) coupled between the various pairs of output lines A, B and C. The subscripts for the respective capacitors and switches in FIG. 2 are indicative of the two output lines associated with those elements. In the present embodiment, the first X of the stages of array 30 include capacitors which have binary weighted branch capacitances from stage to stage. The remaining N-X stages have equal value capacitances in the various branches from stage to stage, as indicated in the following Table. FIG. 2 shows 3N trigger signals, each being associated with one of the switch networks in the stages.

TABLE

| BINARY WEIGHT | | ARITHMETIC WEIGHT | |
|---|---|---|---|
| $C_{AB(1)}$ $C_{BC(1)}$ $C_{CA(1)}$ | } C | $C_{AB(X+1)}$ $C_{BC(X+1)}$ $C_{CA(X+1)}$ | } $2^X C$ |
| $C_{AB(2)}$ $C_{BC(2)}$ $C_{CA(2)}$ | } 2C | . . . | |
| . . . | | $C_{AB(N)}$ $C_{BC(N)}$ $C_{CA(N)}$ | } $2^X C$ |
| $C_{AB(X)}$ $C_{BC(X)}$ $C_{CA(X)}$ | } $2^{x-1} C$ | | |

In one form of the invention, shown in FIGS. 1 and 2, the capacitors in array 30 are in the "delta" configuration, where the 3N trigger signals for network array 30 permit independent control of the switching of each delta capacitor in the various stages. In that embodiment, a combination binary-linear weighted capacitor array is utilized which switches stages in or out at one time per cycle at only the positive peaks of the line voltage. In general, switching off-line of the capacitors of the various stages can occur at either positive or negative (zero current) voltage peaks, i.e. within 180 degrees of a desired time with corresponding turn-on (at K×360 degrees) from this turn-off point.

Figure 3:
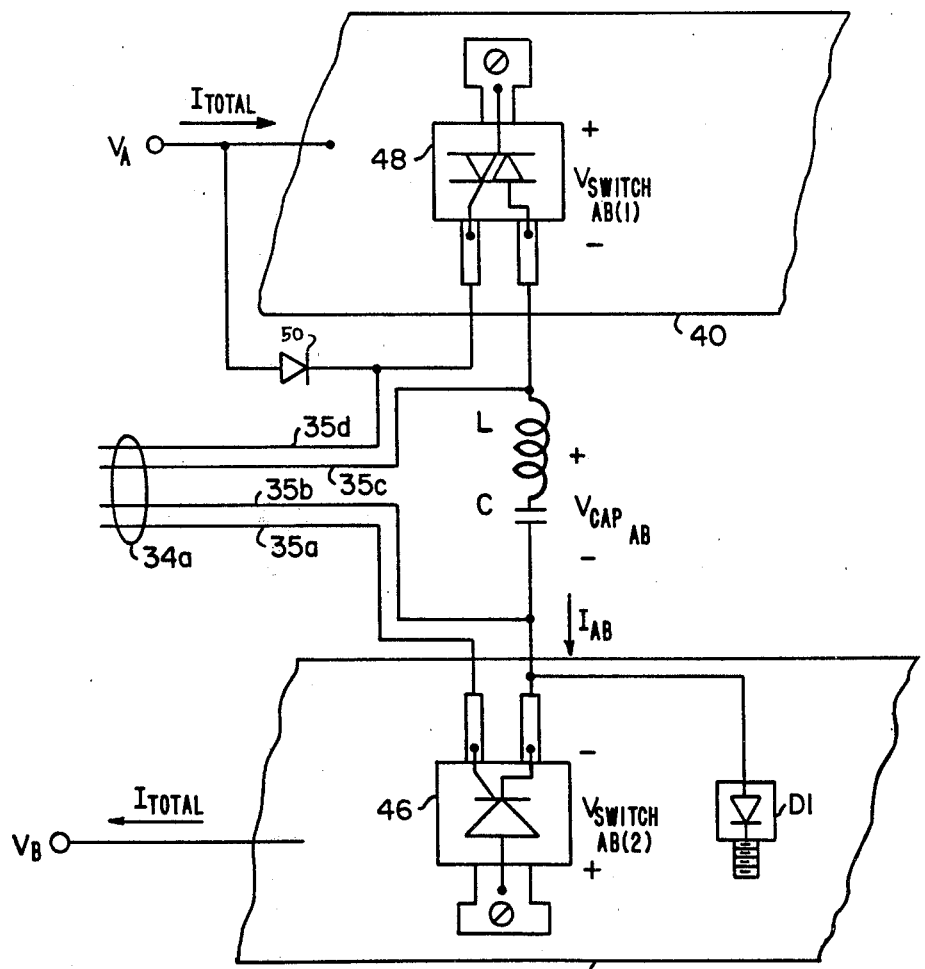
FIG. 3 shows in schematic form, a capacitor network and associated switch network of the array of FIG. 2.

FIG. 3 shows an exemplary form for the first stage line-to-line capacitor and associated switch network for the array 30 between lines A and B on the induction machine 12. In this form, the output lines A and B each provide high current buses for the output current of the various stages. The buses are indicated in FIG. 3 by reference designations 40 and 42. It will be understood that the buses are particularly adapted to provide highly efficient convective heat transfer so that these buses act as heat sinks for the respective components coupled thereto.

The capacitor network is coupled between the bus elements 42 and 40 by semiconductor switches SCR 46 and TRIAC 48, respectively. The capacitor network includes a capacitor (denoted C) in series with an air-core inductor (denoted L). The current through that series capacitor-inductor combination is denoted by $I_{AB}$. In the present embodiment, the capacitors are A.C. capacitors type 520P or metallized polypropylene A.C. capacitors type 325P, manufactured by Sprague.

The capacitor is coupled to the cathode of SCR 46 and the anode of an anti-parallel diode D1. In the present embodiment, SCR 46 has a TO-220AB package having its anode connected in direct thermal and electrical contact with bus element 42. The diode D1 is a stud mounted diode coupled having its cathode in direct thermal and electrical contact with bus element 42. The trigger signal from generator 34 (as defined more fully below) is applied by way of line 34a across the gate-cathode terminals of SCR 46. In FIG. 3, the trigger signal line for the illustrated switch network includes four wires (denoted collectively 34a). The wire 35a running to the gate of SCR 46 has an associated return wire 35b running from the cathode of SCR 46 back to generator 34.

The inductor L is connected directly to the MT1 terminal of TRIAC 48. In the present embodiment, TRIAC 48 has a TO-220AB package having its MT2 terminal connected in direct thermal and electrical contact with the bus element 40. A signal diode 50 has its cathode connected to the gate of TRIAC 48. The anode of diode 50 is connected to the bus 40. The trigger signal from generator 34 for TRIAC 48 is applied by way of line 34a across the gate-MT2 terminals of TRIAC 48. As with SCR 46, a first wire 35c provides the trigger signal to the gate terminal of TRIAC 48, with a return wire 35d running back to generator 34.

With this configuration, the various capacitor networks may be selectively switched three times per machine cycle in a manner so that the "off" or disconnected capacitors remain charged to the peak line-to-line voltage. Current surges are avoided in normal operation by triggering the semiconductor switches (SCR 46 and TRIAC 48) of each phase at the peak line-to-line voltage which occurs at the mid-point between the line-to-line voltage zero crossings. Consequently, there is nominally zero voltage across the semi-conductor switches, and no current surge when those switches are triggered on.

Figure 4:
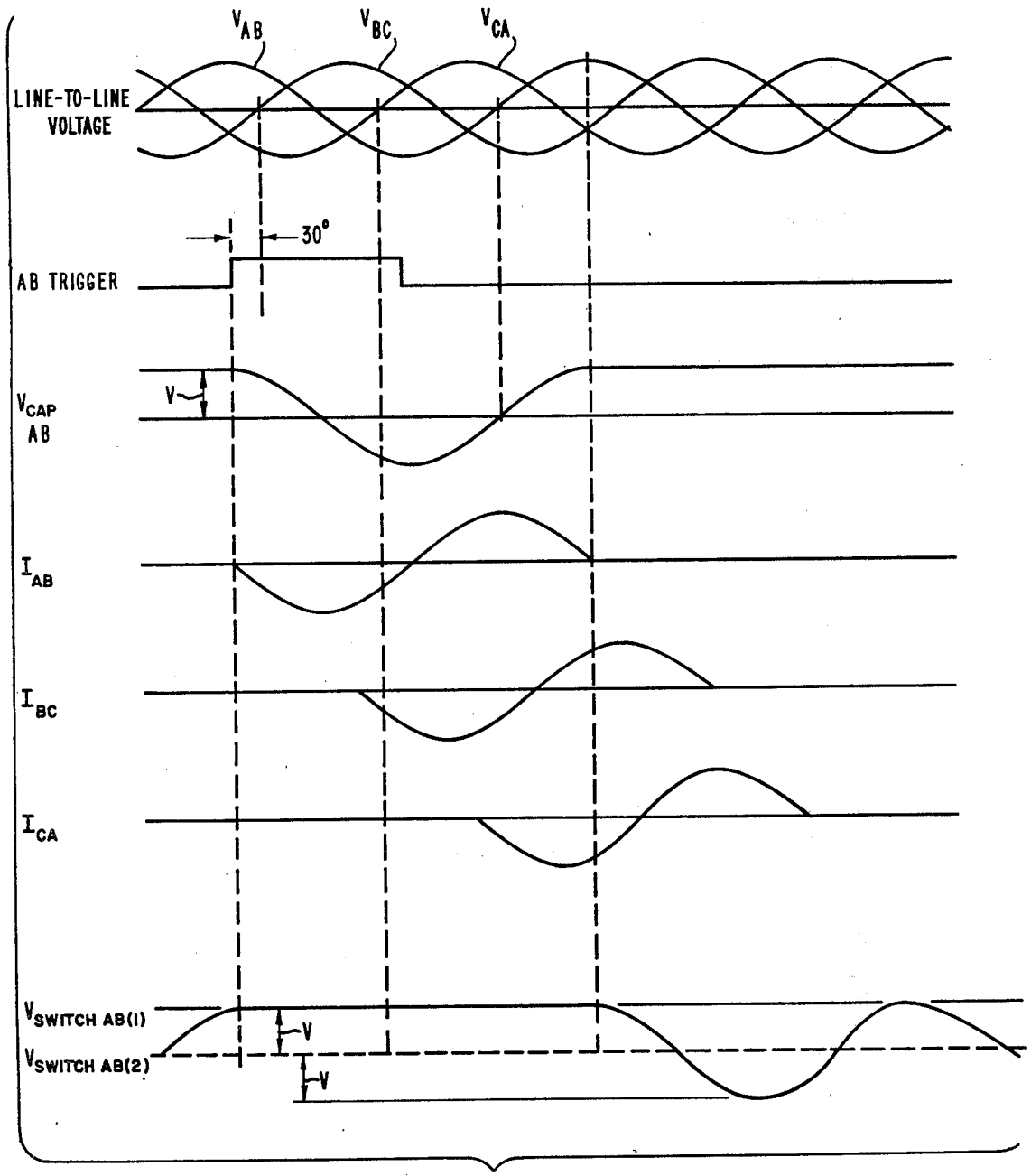
FIG. 4 shows exemplary waveforms illustrating the operation of the array of FIG. 2.

FIG. 4 indicates the representative waveforms of operation for the configuration of FIG. 3 for a single trigger signal on line 34a. The uppermost set of waveforms shows the line-to-line voltages for the lines A,B and C of machine 12. The next waveform shows the AB trigger signal which commences at the peak value of the A-B line-to-line voltage. The next waveform shows the voltage $V_{CAP\ AB}$ across capacitor C. As shown, the nominal capacitor current $I_{AB}$ ramps from zero and has a sinusoidal shape. The inductor L is an air-core inductor coupled in series with the capacitor to accommodate slight timing errors or errors due to waveform distortions. The inductor limits the rate of change of current with time. The inductors further serve to protect the switches during line faults by keeping the peak current within the switch surge current rating. The next two waveforms show the corresponding currents $I_{BC}$ and $I_{AC}$ for the other phases. The last waveform shows the voltages ($V_{SWITCH\ AB(1)}$ and $V_{SWITCH\ AB(2)}$) across the switches 46 and 48. These voltages nominally track the line-to-line voltage $V_{AB}$ except when the switches are conductive. At those times, as noted above, there is nominally zero voltage across those switches.

In operation, the capacitors are switched off the line by removing the trigger signals. The switches have self (uncontrolled) gating in one polarity, so that on the following half cycle, the switches naturally commutate off at a current zero crossing. The switched-off capacitor is left holding a charge proportional to the line-to-line peak voltage. The self gating of the switches in one polarity insures that the "off" capacitors remain fully charged.

Since a capacitor held off the line is charged to the peak system voltage, double the system line-to-line voltage is seen by the semiconductor switch or switches in series with it. For example, the switches must tolerate 1250 volts in a 440 volt, 60 Hertz system, or 1080 volts in a 380 volt 50 Hertz system. Accordingly, the embodiment of FIG. 3 is particularly advantageous since two relatively low voltage (and low cost) moderate current switches may be used in series with each capacitor section.

The capacitor current is nominally a sine wave, but because the capacitor current is proportional to the derivative of voltage, in practice this signal can depart significantly from the sine wave. For this reason, the trigger signals are provided (as described more fully below) are relatively wide. In the preferred form, the trigger command is provided whenever a switch is desired to be on.

The particular configuration of FIG. 3 provides a relatively compact arrangement wherein the TRIAC, SCR and anti-parallel diode all may be connected to the bus elements forming the output lines, which in turn function as electrically hot heat sinks, thereby avoiding the need for individual electrical isolation of the power semi-conductors.

Figure 5:
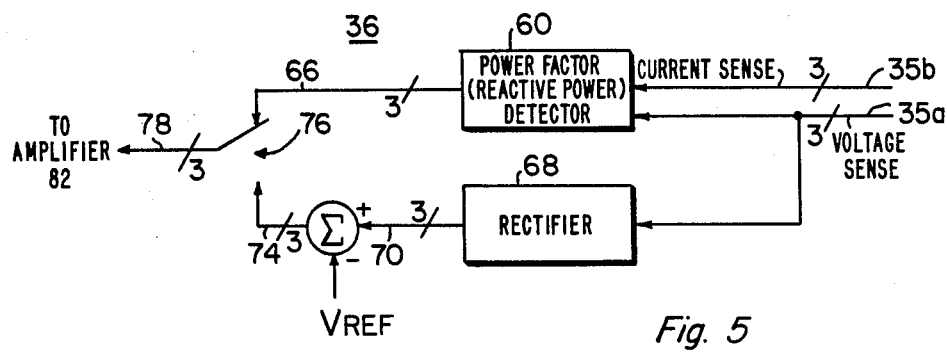
FIG. 5 shows in block diagram form, the feedback sensor of the system of FIG. 1.

FIG. 5 shows the feedback sensor 36 for the present embodiment. Sensor 36 includes a power factor detector network 60 coupled to the voltage sense lines 35a and the current sense lines 35b from the output lines of machine 12. Detector 60 provides output signals on lines 66 which are representative of the reactive power at terminals 14, which in turn are related to the power factors at terminals 14. In alternate embodiments, detector 60 may provide signals directly representative of the power factors at terminals 14.

Sensor 36 also includes a rectifier network 68 coupled to the voltage sense lines 35a. Rectifier 68 provides signals on lines 70 representative of the amplitudes of the voltages at the terminals 14. A summation network 72 provides signals on lines 74 representative of the difference in amplitude of the voltages at terminals 14 and a reference signal. A switch 76 is arranged to be selectively operated in a manner coupling the signals from lines 66 or lines 74 to output lines 78 of the sensor 36. The switch 76 may be operated in conjunction with the switch 16, so that during grid-connected operation, the signals from power factor detector 60 are coupled to lines 78 when switch 16 is in its closed position (coupling the system 10 to the power grid). When the switch 16 is in its open position, i.e. for autonomous operation, the switch 76 couples the signals from lines 74 to lines 78.

Figure 6:
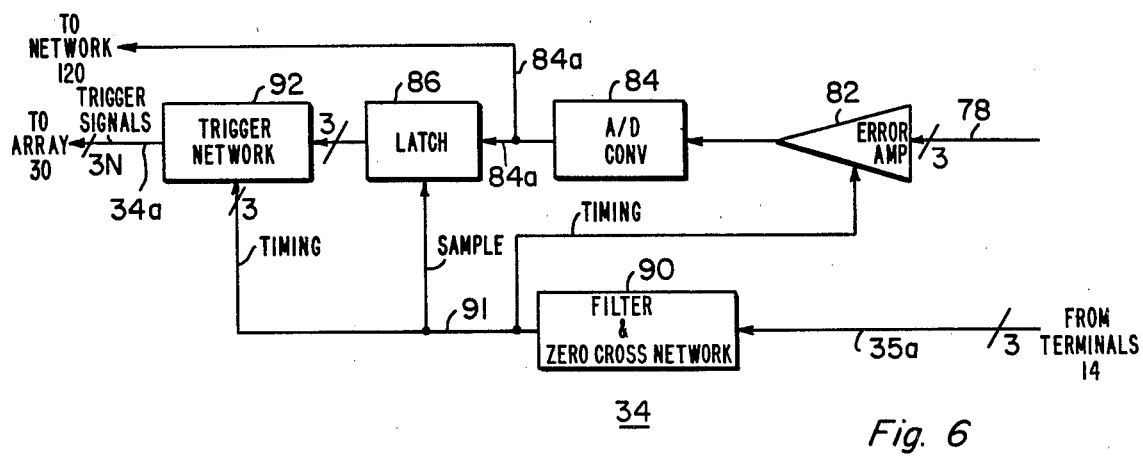
FIG. 6 shows in block diagram form, the trigger signal generator of the system of FIG. 1.

FIG. 6 shows the trigger signal generator 34 in detailed form. Generator 34 includes an error amplifier 82 coupled to signal lines 78 and to timing signal lines 91. In some embodiments, amplifier 82 may include an input multiplexer and an output demultiplexer. The output from amplifier 82 may have its signal time modulated such that sampling in the following latch 86 provides somewhat different capacitor corrections to the individual phases of the system. In this form, balanced voltages can be maintained in the presence of unbalanced loads.

In the present embodiment, the output from amplifier 82 is coupled to a binary A-to-D convertor 84, which in turn is coupled to latch 86. A filter and zero cross network 90 is coupled to terminals 14 to provide a sampling signal to the latch 86 at the system operating frequency. The sampled signal from latch 86 is applied to a trigger network 92. The filter and zero cross network 90 also provides appropriate timing signals to generate the signals for switching the stages of array 30 in and out of operation. Switching "in" occurs at such times when the fully charged capacitors in array 30 are coupled to the peak voltages at the lines of machine 12. Switching "out" occurs prior to a peak voltage with actual turn off at naturally occurring zero capacitor current (which is normally at the voltage peak).

By way of example, the amplifier 82 may be a type 741 operational amplifier (for example as described by National Semiconductor in its "Linear Data Book" at page 3-191 published in 1976). The A/D converter 84 may be a conventional counter-comparator A/D converter such as that described at pages 124–125 of "Analog-Digital Conversion Notes", published by Analog Devices, Inc. in 1977. The latch 86 may include an RCA type CD40174 (as offered by RCA in its "Solid State Products" sales literature of October 1979) integrated circuit in a conventional latch configuration. The trigger network 92 may include a plurality of gated drivers, for example, each including an RCA type CD4001 integrated circuit gate (as described at page 32 of RCA's "COS/MOS Integrated Circuits", published in its 1975

Databook Series) coupled to a Sprague type ULN2004 integrated circuit driver (as described at page 4-2 in the Sprague "Integrated Circuit Data Book-1", published in 1978).

The trigger network 92 is responsive to the sampled values in latch 86 to select and activate the appropriate ones of the 3N trigger signal lines for the appropriate stages to adaptively modify the value of the capacitances coupled across the output lines of machine 12. In various forms of the invention, the trigger network 92 may include a programmed microprocessor, or some other suitable form of computational network.

With the control of individual branches of the various stages of array 30, both line-to-line and line-to-neutral unbalanced loads may be accommodated, provided that the net loads (before correction) are inductive (since only capacitors are used for control).

Figure 7:
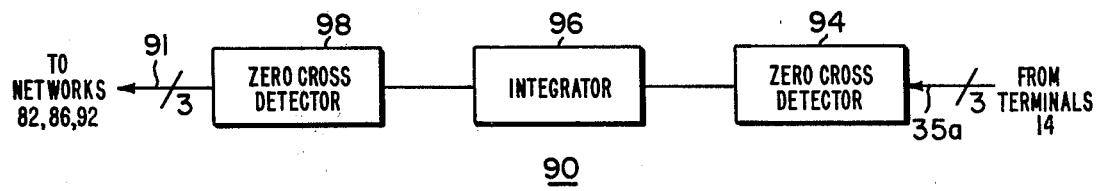
FIG. 7 shows in block diagram form, the filter and zero cross detector of the trigger signal generator of FIG. 6.

In the preferred form of the invention, the filter and zero cross detector network 90 has the form shown in FIG. 7 wherein a first zero crossing detector network 94 is coupled to an integrator 96, which in turn is coupled to a second zero cross detector network 98. This form of filter and zero crossing detector 90 is particularly advantageous where the line-to-line voltage at terminals 14 includes transients (such as due to rectifier loads) which may cross zero. In this configuration, the network 94 provides a binary signal which has a state change for each zero crossing of the input. The integrator 96 integrates this resultant signal to provide a nominally triangle-waveform which has zero crossing points nominally at the desired switching times. The second zero cross detector 98 provides a trigger timing signal for controlling the switching of the stages for the various line-to-line pairs.

Figure 8:
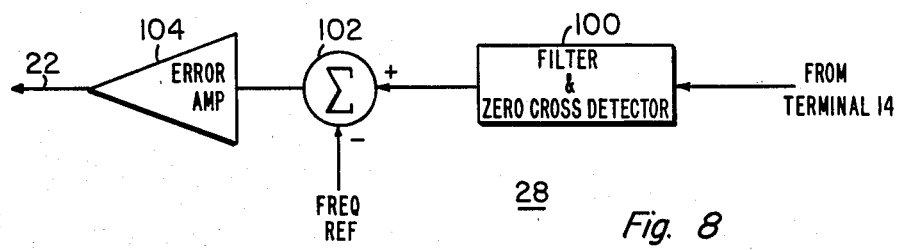
FIG. 8 shows in block diagram form the frequency controller of the system of FIG. 1.
Figure 9:
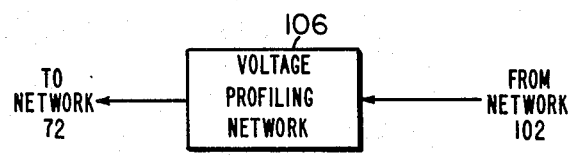
FIG. 9 shows in block diagram form, an exemplary voltage profiling network for use with the system of FIG. 1.

FIG. 8 shows the frequency controller for the preferred embodiment. In this embodiment, the controller 28 includes a filter and zero crossing detector network 100 coupled to terminals 14. The output of network 100 is coupled to a summing network 102 which in turn is coupled to an error amplifier 104 for driving line 22. In practice, the network 100 may be the same as corresponding network 90 in generator 34. In such cases, the output from generator 90 may be used directly in controller 28 in place of that provided by network 100. The summing network 102 provides a frequency error signal representative of the difference in frequency of the voltage at terminals 14 and a reference frequency. This frequency error signal is applied by way of error amplifier 104 and line 22 to the variable speed prime mover.

In one form of the invention, the output from the summing network 102 may be coupled by way of a voltage profile network to an input of the summing network 72 of the feedback sensor 36. With this configuration, the voltage profile network 106 modifies the commanded system voltage on line 78 as a function of the system frequency error. In normal operation, the system 10 frequency error is small, and there is no significant output from the voltage profile network 106. However, in momentary overload situations, e.g. when the system 10 is called upon to start relatively large motor loads, the resultant slow down at the prime mover 20 can be directly sensed by detecting the reduced frequency on output lines of machine 12. Network 106 detects times when the frequency at terminals 14 falls below a predetermined threshold, and for a range of frequencies below that threshold, provides an appropriate signal to network 72 to establish a relatively low output voltage from machine 12, for example, by reducing the voltage to 0.707 of the nominal voltage when a few percent slow-down is detected. As a consequence of this operation, the effective load seen by the prime mover 20 is substantially reduced and that element may continue to operate near the normal system frequency where it can provide more power and thus maintain the highest possible output voltage. This feature is particularly advantageous in preventing inadvertent cut outs when relays are used in the system. This configuration may be utilized in the situation where a single induction generator system 10 is operating, or where a plurality of such induction generator systems are coupled in parallel at terminals 14.

It is well known that during induction generator start-up, an initial remnant flux must either exist in the machine or be placed in the machine 12. In the prior art, this remnant flux may be placed in the machine at zero mechanical speed with a D.C. bias current in one winding of the generator, or alternatively a sufficient remnant flux naturally exists in the machine from the last time it was operated. For a single autonomous induction generator system, the switched capacitor array may be used to create voltage build-up in the generator automatically when the machine speed reaches some minimum value. The load is normally disconnected during such flux initialization, and until proper output voltage and frequency are established. However, when a spinning but unexcited induction machine is connected to an external grid, or another induction generator, a very large current transient occurs until the flux builds up in this machine. For example, such a transient might well cause an instantaneous voltage drop on the order of 50% if two identical machines are paralleled in this manner. If the machine to be added to the grid is initially excited by using a separate capacitor bank, the transient would very likely be even worse unless the frequencies are phase locked using conventional synchronous machine line connection techniques.

Figure 10:
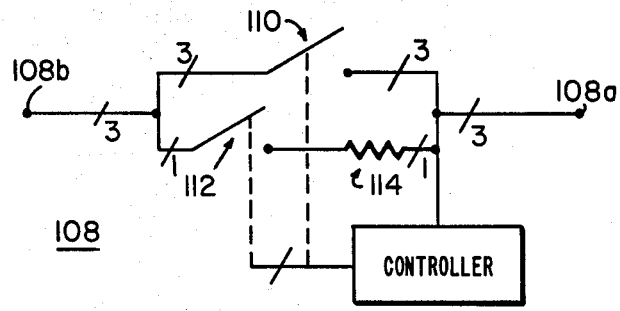
FIG. 10 shows in block diagram form, an exemplary thermistor network or use with the system of FIG. 1.

In accordance with the present invention, a thermistor network, as shown in FIG. 10, may be used to bring an unexcited, but near synchronously turning induction machine on-line with a minimal transient. The network of FIG. 10 includes a two terminal (108a and 108b) network having a three phase switch 110 coupled between those terminals 108a and 108b, and a series connected single phase switch 112 and thermistor 114 coupled in parallel with one phase of the switch 110. The thermistor 114 has a temperature dependent resistance characteristic, providing a relatively high resistance at low temperatures and a relatively low resistance at high temperatures. An associated controller 116 controls the operation of the switches 110 and 112. The network 108 is coupled between one of the terminals 14 of an operating or grid-connected induction machine and the corresponding output terminals of the induction machine to be brought on line. By way of example, to bring system 10 of FIG. 1 on line to the external grid, network 108 may be coupled into one of the output lines between terminals 14 and switch 16. In other multiples systems, a single network 108 may be used repetitively (after cooling down) to sequentially bring the multiple systems on line. In alternative systems, separate thermistor branches similar to the branch including switch 112 and thermistor 114 may be similarly coupled in each of the output lines from the induction machine.

In operation, with the system 10 including network 108 which is to be coupled to an external grid (e.g. by switch 16) or another induction generator, the switches 110 and 112 are initially controlled by controller 116 to be in their open positions. Then, the unexcited induction machine 12 is brought up to a speed close to the desired line frequency. Frequency or phase locking is not required. The switch 112 is then closed by controller 116, bringing the thermistor 114 into one of the output lines which connects the two generators in parallel. With this configuration, the power dissipated in the thermistor 114 causes its temperature to increase, thereby lowering its resistance. By appropriate thermistor device selection, it will be understood that the thermistor (or plurality of series connected thermistors) is selected so that its resistance-temperature characteristic is matched to the rate of voltage build-up. Consequently, the current in the thermistor increases and its resistance decreases until the temperature and resistance reach such values so that the current through there is essentially equivalent to the steady state final value which is required for the no-load magnetizing current. At this point, controller 116 opens switch 112 while closing the three phase switch 110. The system 10 is then fully on-line without a transient. In practice, controller 116 changes the state of switches 110 and 112 by detecting when the thermistor voltage falls below a predetermined threshold, or alternatively may just provide a predetermined time delay. The same thermistor 114 may be used after cooling to provide nearly transient free excitation for additional systems as they are brought on-line.

The prior art induction generator systems have a relatively limited ability to start A.C. motor loads. Typically, when an A.C. motor load is started, that load requires much more reative current than during normal (steady state) run operation. If insufficient capacitance is available in the induction generator capacitive array 30, the voltage provided by system 10 rapidly collapses toward zero when a relatively large A.C. motor is switched onto the output line 14. Motor starting ability of the system is enhanced by switching in an overload capacitance array network across the output terminal 14 during overload conditions, such as during start-up of a large A.C. motor.

Figure 11:
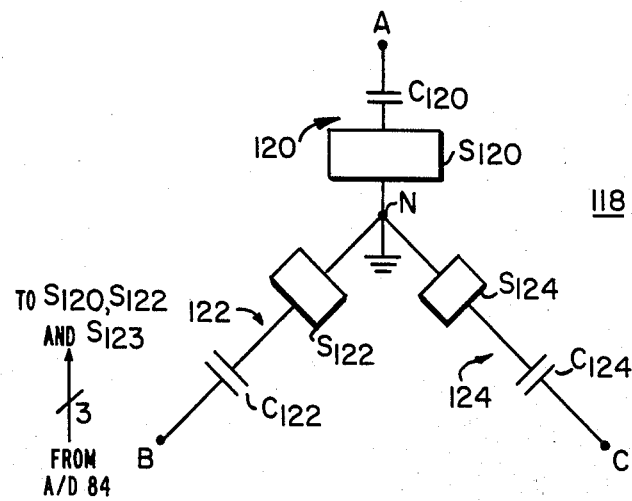
FIG. 11 shows an overload capacitance array network for the system of FIG. 1.
Figure 12:
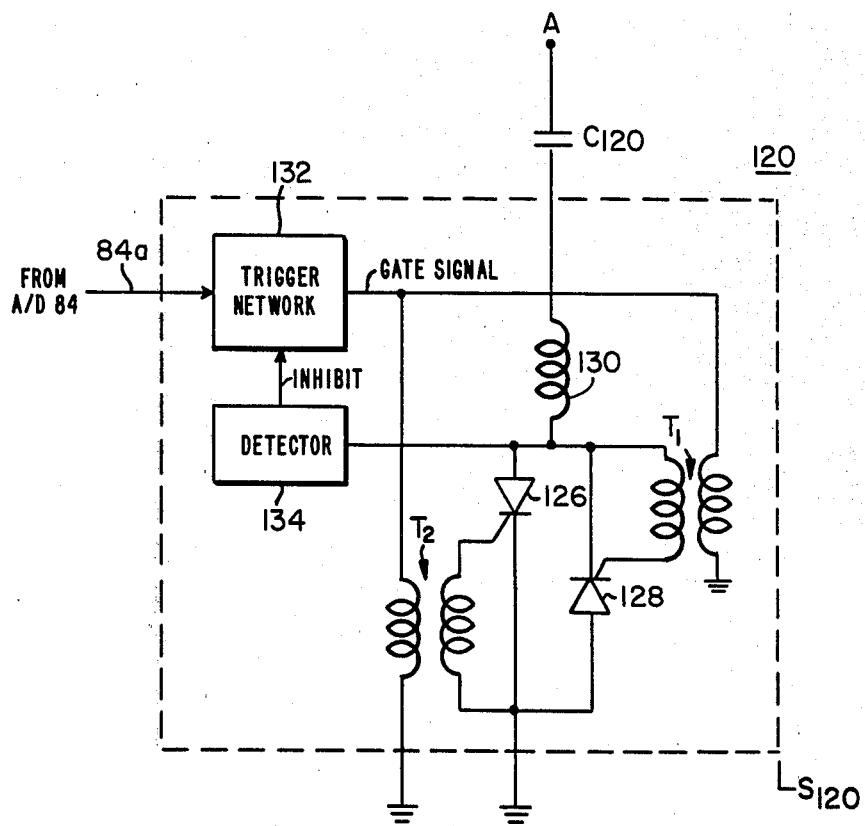
FIG. 12 shows in schematic form, branch network for the network of FIG. 11.

FIG. 11 shows an exemplary overload capacitance array network 118, including three similar branch networks 120, 122 and 124, for connection in a "wye" configuration to lines A, B and C and to a neutral (or ground) line N of the system 10 of FIG. 1. Each of branch networks 120, 122 and 124 includes a capacitor (denoted C with a corresponding sub-script) and a switch (denoted S with a corresponding sub-script). By way of example, FIG. 12 shows a particularly economical embodiment of the branch network 120 which includes a high current density A.C. electrolytic capacitor $C_{120}$ coupled in series with a semiconductor switch network $S_{120}$ between the output line A and ground. In the illustrated embodiment, the capacitor $C_{120}$ may be a "motor start" capacitor, designed for intermittent duty, such as the Sprague Type 9A. This capacitor type generally includes a pair of polarized capacitor connected back-to-back in series.

The switch network $S_{120}$ includes a pair of oppositely directed SCR's 126 and 128 connected in parallel to form a bidirectional switch. The pair of SCR's is connected in series with an air core inductor 130 between capacitor 120 and a common potential, such as ground. The output of a trigger network 132 is connected to the primary coils of trigger transformers $T_1$ and $T_2$. The secondary coils of transformers $T_1$ and $T_2$ are connected across the cathode and gate terminals of SCR's 126 and 128, respectively. A detector 134 provides as inhibit signal to the trigger network 132. The trigger network input is coupled to A/D converter 84. In operation, when extra capacitance is required (which may be due to AC motor start-up), the signal from A/D 84 normally causes a gate signal from network 132 to switch SCR's 126 and 128 to their conductive state. However, if the voltage across SCR's 126 and 128 is above a predetermined threshold, the inhibit signal from detector 134 prevents turn-on of SCR's 126 and 128 to their nonconductive states until a point in the waveform when transients are minimal an arbitrary initial condition on the capacitor voltage. With this configuration, the network 118 is optimized to accommodate start-up of an uncharged capacitor or re-start up if the relatively poorer thermal and electrical capacitor voltage is anywhere between zero and full voltage.

In the preferred embodiment, the motor start capacitors are connected in a "wye" configuration to allow use of available lower capacitor voltage ratings. In lower voltage applications, a "delta" configuration may more economically be used. In all of these configurations, capacitor thermal protection in situations of inadvertent capacitor over use may be accommodated by inhibiting the motor start array switches if the series air core inductor exceeds a predetermined temperature.

Figure 13:
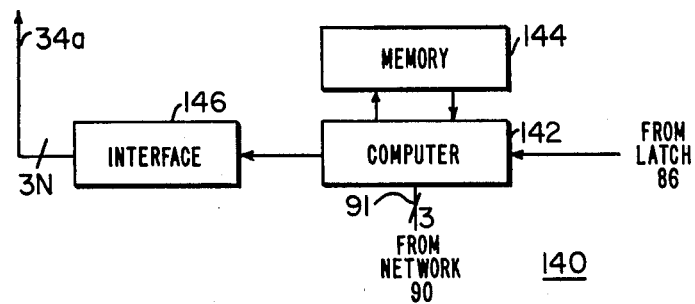
FIGS. 13–18 show embodiments of the system of FIG. 1 adapted in accordance with the present invention for correction of power factor for unbalanced loads.

FIG. 13 shows, in block diagram form, an alternate power factor correction network 140 in accordance with the present invention which may replace trigger network 92 of FIG. 6. Network 140 includes a computer 142 and associated memory 144 and an interface 146. When switch 76 of FIG. 5 connects line 66 to line 78, then network 140 operates as a closed loop power factor correction system which provides power factor correction on a periodic basis for loads which may be balanced or unbalanced.

During the first measurement cycle and for all subsequent cycles, the power factor correction network measures the residual three reactive power terms (each quadrature line current times its corresponding line-to neutral voltage) during one cycle. The resultant residual or error signals are representative of the change in reactive power since that last correction. The system 140 then uses this eror signal to determine the capacitance to be added to or subtracted from the respective phases of the array 30 during the next correction cycle. In FIG. 13, the memory 144 provides storage for data representative of the state of network 30, i.e. data which defines the existing capacitors that are on-line. Between power factor correction cycles, computer 142 monitors the signals from power factor detector 60 to determine the three independent line-to-line capacitance changes required to correct the power factor. Computer 142 sums these incremental values with the previous values as stored in memory 144 to compute the new desired values. At a correction time, computer 142 generates control signals representative of the new values which are to be switched from the network 30. These control signals are the trigger signal which are applied by way of interface 146 to the various stages of array 30.

Thus, the computer 142 measures the residual line-to-neutral reactive power. This value may be positive or negative. In systems where array 30 is a wye configuration, the complement of this reactive power is the value required to compensate (i.e. the corresponding value capacitive increment, positive or negative, may be switched into the system from line-to-neutral).

In the preferred embodiment, which utilizes a three phase delta configuration capacitor array 30, the computer 142 first determines the required incremental line-to-neutral reactive power correction value for the output line terminal of each line, and then converts that value to an equivalent reactive power delta correction. The incremental delta capacitor equivalent associated with a determined incremental wye value is formed from two equal incremental delta capacitors having one terminal coupled to the associated wye terminal, with each of those incremental delta capacitors having the same sign and one-third the capacitance of the incremental value of the wye computed value. The third opposing leg incremental delta capacitor has an opposite sign and has the same one-third capacitance magnitude.

These above values for the various output terminals are incremental values. The net required delta capacitors are determined by the computer 142 by adding to the most recent corrective state, the required change, which in the algebraic sum of the three incremental capacitance values for each terminal. Thus, the three new capacitors for the delta network are obtained by adding appropriately transformed wye incremental values to the previous delta value.

The computer 142 then generates the trigger signals on line 34a which switch the desired total capacitor value across the various lines at the next cycle during which power factor correction is made.

In cases where a computed delta capacitive value for power factor correction is determined to have a net negative value, the computer 142 modifies the values in the following optimum manner before generating the trigger signals. Computer 142 first subtracts one-third of the magnitude of this negative value from each of the other non-negative line-to-line capacitors to specify two new total values to be placed on line. The terminal pair associated with the original desired negative capacitor compensation is left uncompensated.

FIGS. 14–18 show an alternate configuration for this power factor correction network for a three phase system 10 having a delta configuration capacitor array 30 and adapted to optimally compensate for unbalanced line-to-line or line-to-neutral loads. In this configuration, network 160 (FIG. 14) replaces block 60, lines 66 and 78 of FIG. 5 and blocks 82 and 84 of FIG. 6. Timing signals for the various sampling operations provided by network 160 are provided by line 91 from network 90. In network 160, a pulse width modulator (PWM) type multiplier is used for the reactive power computation to achieve accuracy and simplicity, although other forms of multipliers would also provide the necessary data. The pulse width modulation representations of the line-to-neutral voltages are created by comparing the line-to-neutral voltage against a triangle reference. These digital representations allow for a simpler, digital type multiplication implementation with the integrated currents. For fixed voltage, the reactive power measurement translates to a capacitor compensation value. If the voltage increases, the compensation capacitors reactive power also increases. Thus, for the same reactive power at higher voltage, a smaller compensation capacitor is appropriate, indicating that the multiplier product (reactive power measurement) should be voltage compensated before using it to specify capacitance. These line voltage variations can be substantially compensated by appropriately varying the amplitude $V_p$ of the triangle reference, $V_{SAW}$. This form of the invention will now be described in detail.

Figure 14:
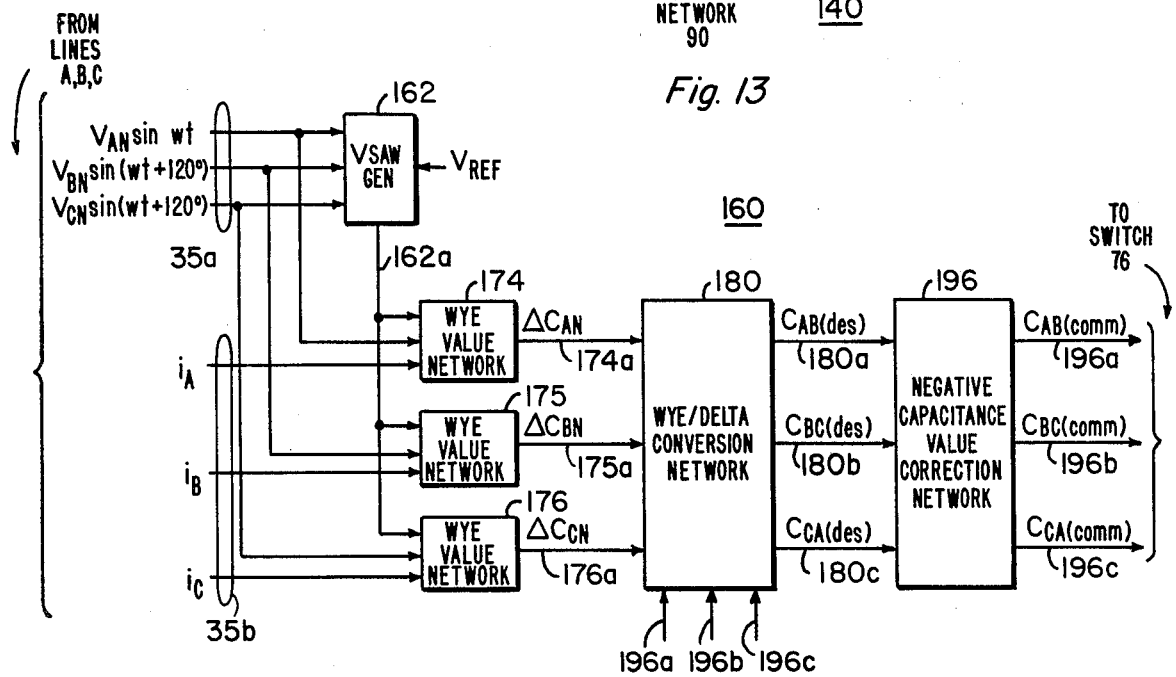

FIG. 14 shows a general block diagram of network 160, which includes $V_p$ generator 162 (shown in detail in FIG. 15) coupled by way of voltage sense lines 35a to output lines A, B, and C of machine 12. Each of lines 35a provides a sinusoidal signal representative of the line-to-neutral voltage for that line (represented in FIG. 14 by $V_{AN}$ sin wt, $V_{BN}$ sin (wt+120°) and $V_{CN}$ sin (wt+240°) for lines A, B, and C, respectively). Generator includes a full- (or half-) wave rectifier and filter 164, scaling networks 166 and 167, summing network 168 and triangle generator 169. For this block diagram, the signal $V_{REF}$ equals $K_1$ times the nominal full wave output voltage for machine 12 and the nominal triangle wave amplitude $V_p$ (nom) equals $V_{REF}$. With this configuration, generator 162 provides a compensated triangle output, $V_{SAW}$ on line 162a having a peak value $V_p$ and a frequency $f_o$. $V_p$ thus corresponds to $[(2V_L/V_L(nom))-1]V_{REF}$, where $V_L$ is the amplitude of the signal on line 166a. This linear first order compensation substantially eliminates the scaling error due to compensation capacitor dependence on voltage, which improves the system dynamic response.

Network 160 also includes three similar wye value networks 174–176, where each of these networks is coupled to line 162a, one of lines 35a, and an associated one of lines 35b (which provide signals $i_A$, $i_B$ and $i_C$ representative of the currents in lines A, B and C, respectively). Network 174 is shown in detailed form in FIG. 16. Network 174 includes scaling networks 177 and 178, multiplier 180, summing network 182, zero cross detector 184 and integrator 186 (which is reset once during each compensation cycle). The networks 175 and 176 are similarly configured. With this configuration, networks 174, 175 and 176 provide output signals on lines 174a, 175a and 176a, respectively, representative of the incremental wye (line-to-neutral) capacitance values ($\Delta C_{AN}$, $\Delta C_{BN}$ and $\Delta C_{CN}$, respectively) for power factor correction.

Thus, with this configuration, the line-to-neutral power factor signals are generated by simultaneously integrating (after reset), over a 360° interval, the products of the line-to-neutral voltages for the line pairs, and the integrals of the a.c. component of the corresponding line currents. As a result, the system provides substantial harmonic reduction. Moreover, the average products of the harmonics are negligible even when both current and voltage waveforms contain distortions. The system also provides the 90° phase shift of the quadrature current so that the product output contains a d.c. term proportional to reactive power only.

Figure 17:
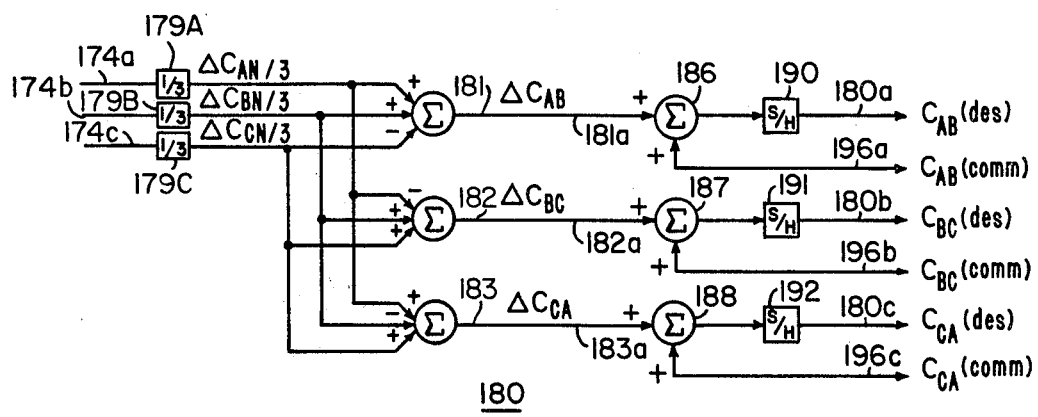

Lines 174a, 175a and 176a are each coupled to a wye/delta conversion network 180 (shown in detail in FIG. 17). Network 180 includes three scaling networks 179A, 179B and 179C and three summing networks 181–183 which provide incremental delta (line-to-line) capacitance values ($\Delta C_{AB}$, $\Delta C_{BC}$ and $\Delta C_{CA}$, respectively) on lines 181a, 182a and 183a for power factor correction. The signals on lines 181a, 182a and 183a are coupled to associated ones of summing networks 186–188 where those signals are summed with the respective ones of commanded capacitance signals $C_{AB}$(comm), $C_{BC}$(comm), and $C_{CA}$(comm) to provide signals which are sampled and held in sample-and-hold (S/H) networks 190–192, respectively. The outputs from S/H networks 190–192 provide desired capacitance signals $C_{AB}$(des), $C_{BC}$(des), and $C_{CA}$(des) on lines 180a, 180b and 180c, respectively. The latter signals represent the capacitance already across the various terminals of machine 12 (from the next previous measurement cycle) plus the incremental value determined during the current measurement cycle.

Figure 18:
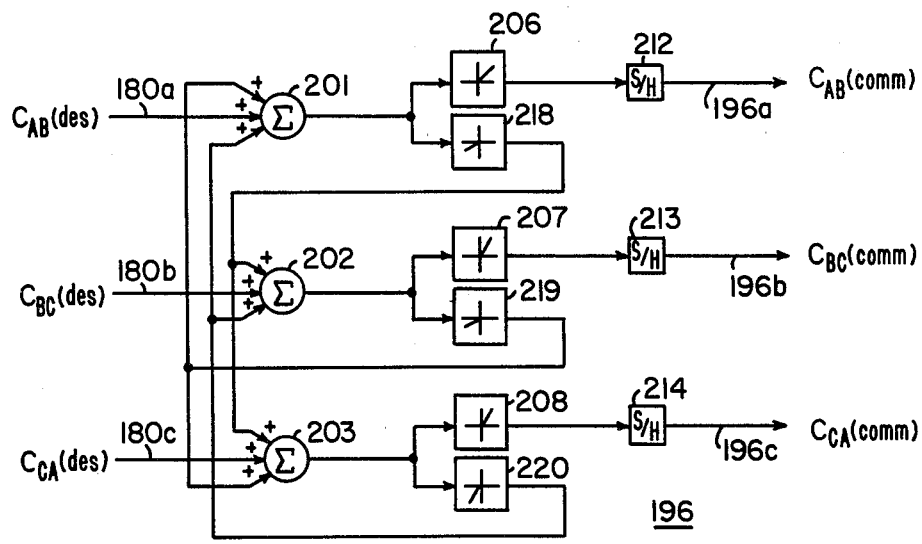
Figure 15:
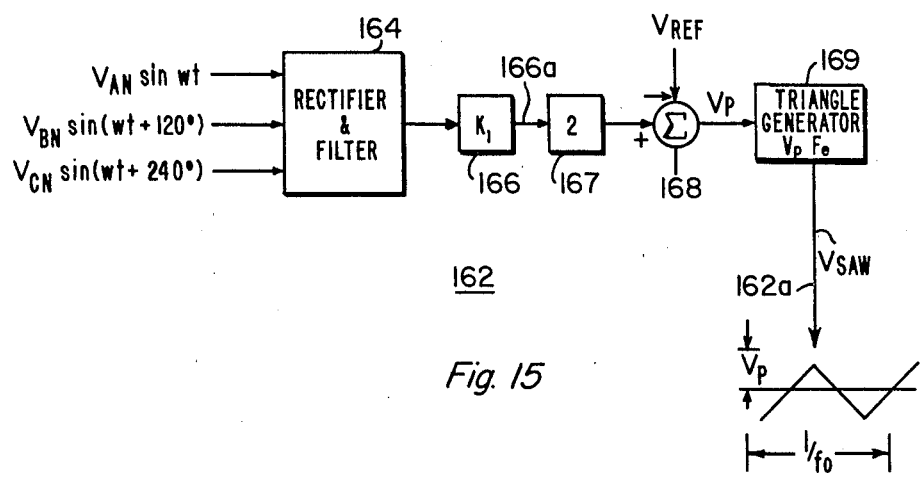
Figure 16:
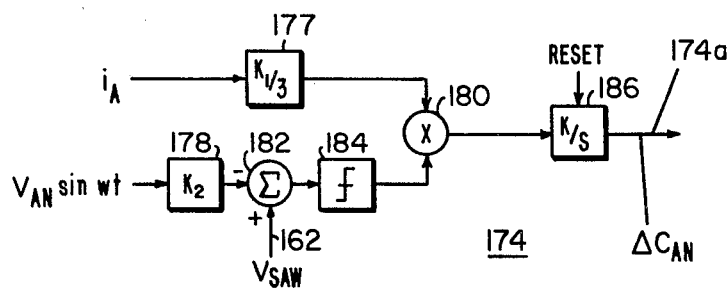

The lines 180a, 181a, and 182a are coupled to negative capacitance value correction network 196 (shown in detail in FIG. 18). Network 196 includes three summing networks 201-203 having an input coupled to a respective one of lines 180a, 180b and 180c. Each of networks 201-203 has its output coupled to one of three networks 206-208 having a continuous $V_{in}/V_{out}$ transfer function which passes through (0,0) and has a slope of 1 in the first quadrant and output equal to zero in the third quadrant. The output from each of networks 206-208 is coupled by way of one of sample-and-hold (S/H) networks 212-214 to one of output lines 196a, 196b and 196c. Each of networks 201-203 also has its output coupled to one of three networks 218-220 having a $V_{IN}/V_{OUT}$ transfer function which passes through (0,0) and has a slope equal to 0 in the first quadrant and a slope equal to ⅓ in the third quadrant. The output from each of networks 218-220 is coupled to a summing input of the two networks 201-203 which are not coupled to its input. With this configuration, when one of the desired capacitance signals is negative, command capacitance signals are generated which correct the command values to provide optimal power factor correction with zero or positive capacitances only.

By way of example, each of networks 206-208 and 218-220 may have the form of a precision clamp having the general configuration shown in National Semiconductor's "Application Note 31" by R. C. Dobkin, dated February 1978.

In summary, the system 10 using network 142 performs simultaneous three-phase reactive power sensing during one 360 degree interval of the line frequency by simultaneously integrating three signals, each being proportional to the product of an integrated (90 degree phase shift of fundamental) line current and its respective sinusoidal line-to-neutral voltage. The three integrators are reset prior to initiation of a new measurement cycle. As a result, by integrating over 360 degrees, the reactive power without additional filtering is determined during one cycle. In this configuration, the integrator 176 provides harmonic reduction, 90 degree phase shift and frequency compensation (achieved by integrating line current prior to multiplication by line-to-neutral voltage). The present system is a closed loop configuration in that a power factor correction value is already present in parallel with the load thus the reactive power error is measured and the correction value is adaptively modified. The system 10 provides relatively high speed closed loop power factor correction and can also accommodate unbalanced line-to-line and line-to-neutral inductive loads.

In general, the compensation capacitors are not taken on (or off) line during the 360 degree measurement interval to avoid measurement errors. The new values of capacitance, computed after a measurement, are placed on line at the next opportunity consistent with the transient-free switch-on.

This reactive power compensation approach minimizes the three-phase RMS reactive currents even when full compensation is not possible with delta connected capacitors only. This similar situation arises, for example, during heavy unbalanced loading such as a single phase line-to-neutral connected motor load is present.

While the exemplary power factor correction systems of FIGS. 13-18 have been shown and described in conjunction with an induction generating system, it will be understood that systems of this type may also be more generally used for other types of power factor correction, for example, as a local power factor corrector near a time varying, unbalanced load which is coupled to a power grid.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A power factor correction system for an n-phase power distribution system which provides power on at least n power lines, wherein each power line is coupled to an associated terminal, comprising:
    A. an N-stage switched capacitor array, where N is an integer, each stage including n capacitor networks, each network being associated with a pair of said n power lines, wherein the capacitor networks within each stage are each characterized by a predetermined capacitance for that stage, and wherein each capacitor network includes an associated capacitor switch means, each switch means being responsive to a trigger signal for selectively coupling said capacitor network across its associated pair of power lines,
    B. feedback means coupled to said power lines and including trigger means for generating said trigger signals,
wherein said feedback means includes power factor correction means for generating power factor signals representative of the power factors at the respective ones of said terminals, and wherein said feedback means includes means for coupling said power factor signals to said trigger means whereby said power distribution system delivers substantially only real power to external loads coupled to said terminals, and
wherein said power distribution system includes n+1 power lines, one of said power lines being a neutral line, and wherein said power factor correction means includes means for generating said power factor (PF) signals for each line-to-neutral pair by integrating, over a 360 degree interval, the product of the line-to-neutral voltage at the respective terminals and the integral of the a.c. component of the corresponding line current for the line.

2. A system according to claim 1 wherein said PF signal generating means includes means for pulse width modulating signals representative of said line-to-neutral voltages to generate a two state output signal, and for demodulating signals representative of said integral of said currents with said two state output signal to generate said PF signal.

3. A system according to claim 1 wherein said PF signal generating means includes means for pulse width modulating signals representative of said integral of said currents to generate a two state output signal, and for demodulating signals representative of said line-to-neutral voltages with said two state output signal to generate said PF signal.

4. A system according to claim 2 including means for compensating said PF signals by varying the amplitude of the pulse width modulating means reference waveform at twice the percentage rate as the percentage line voltage change from nominal.

5. A system according to claim 3 including means for compensating said PF signals by varying the amplitude of the pulse width modulating means reference waveform at twice the percentage rate as the percentage line voltage change from nominal.

6. A power factor correction system for an n-phase power distribution system which provides power on at least n power lines, wherein each power line is coupled to an associated terminal, comprising:

A. an N-stage switched capacitor array, where N is an integer, each stage including n capacitor networks, each network being associated with a pair of said n power lines, wherein the capacitor networks within each stage are each characterized by a predetermined capacitance for that stage, and wherein each capacitor network includes an associated capacitor switch means, each switch means being responsive to a trigger signal for selectively coupling said capacitor network across its associated pair of power lines, B. feedback means coupled to said power lines and including trigger means for generating said trigger signals, wherein said feedback means includes power factor correction means for generating power factor signals representative of the power factors at the respective ones of said terminals, and wherein said feedback means includes means for coupling said power factor signals to said trigger means whereby said power distribution system delivers substantially only real power to external loads coupled to said terminals, and wherein said feedback means further includes:

(1) means operative during a current measurement interval for generating a set of first signals representative of the voltages at the respective ones of said terminals relative to a common potential on a neutral line, (2) means operative during a current measurement interval for generating a set of second signals representative of the currents in the respective ones of said output lines, (3) means operative during a current measurement interval for generating at the end of said interval a set of reactive power (RP) signals representative of the line-to-neutral reactive powers at said terminals, (4) means for converting said set of RP signals to a corresponding set of incremental correction signals, (5) means for summing the respective ones of said set of incremental correction signals with the corresponding signals of a previous set of correction signals to generate a set of updated correction signals, (6) means for generating a set of command signals representative of said updated correction signals, each of said command signals being representative of capacitance value to be coupled across the associated line-to-neutral pair, (7) transfer means for coupling said command signals to said trigger means, whereby the reactive power at said terminals is substantially minimized.

7. A system according to claim 6 wherein said RP signal generating means includes:

means for generating a set of current signals representative of the integral of the respective currents at said terminals, means for generating said RP signals by integrating the product of the respective ones of said current signals and the respective line-to-neutral voltages at said terminals.

8. A system according to claim 6, wherein each stage of said array has its capacitor networks coupled between two of said non-neutral power lines, whereby each stage has a delta configuration, and wherein said command signal generating means includes means operative when one of said command signals is representative of a negative capacitance value, to modify said command signals whereby the command signal for the negative value signal is modified to be representative of zero and the other command signals are modified so that their representative capacitance is reduced by one nth of the magnitude of said negative value.

9. A system according to claim 7, wherein each stage of said array has its capacitor networks coupled between two of said non-neutral power lines, whereby each stage has a delta configuration, and wherein said command signal generating means includes means operative when one of said command signals is representative of a negative capacitance value, to modify said command signals whereby the command signal for the negative value signal is modified to be representative of zero and the other command signals are modified so that their representative capacitance is reduced by one nth of the magnitude of said negative value.

* * * * *